United States Patent
Johns et al.

(10) Patent No.: US 10,834,102 B2
(45) Date of Patent: Nov. 10, 2020

(54) CLIENT-SIDE ATTACK DETECTION IN WEB APPLICATIONS

(71) Applicant: SAP SE, Walldorf (DE)

(72) Inventors: Martin Johns, Karlsruhe (DE); Martin Haerterich, Wiesloch (DE); Christoph Haefner, Nussloch (DE)

(73) Assignee: SAP SE, Walldorf (DE)

( * ) Notice: Subject to any disclaimer, the term of this patent is extended or adjusted under 35 U.S.C. 154(b) by 243 days.

(21) Appl. No.: 15/862,830

(22) Filed: Jan. 5, 2018

(65) Prior Publication Data

US 2018/0198807 A1    Jul. 12, 2018

(30) Foreign Application Priority Data

Jan. 11, 2017    (EP) ..................................... 17000048

(51) Int. Cl.
| | |
|---|---|
| *H04L 29/06* | (2006.01) |
| *G06F 21/57* | (2013.01) |
| *G06F 21/54* | (2013.01) |
| *G06N 20/00* | (2019.01) |

(52) U.S. Cl.
CPC .......... *H04L 63/1416* (2013.01); *G06F 21/54* (2013.01); *G06F 21/577* (2013.01); *H04L 63/1425* (2013.01); *H04L 63/1433* (2013.01); *G06N 20/00* (2019.01)

(58) Field of Classification Search
CPC ....... G06F 21/54; G06F 21/577; G06N 20/00; H04L 63/1416; H04L 63/1425; H04L 63/1433
See application file for complete search history.

(56) References Cited

U.S. PATENT DOCUMENTS

| | | | | |
|---|---|---|---|---|
| 8,869,267 | B1 * | 10/2014 | Smith .................... | G06F 21/554 726/22 |
| 10,129,072 | B1 * | 11/2018 | Field .................... | H04L 41/0266 |
| 2009/0030923 | A1 * | 1/2009 | Chalmers .............. | G06F 16/954 |
| 2009/0144545 | A1 * | 6/2009 | Dhuvur ................. | G06F 21/552 713/165 |

(Continued)

FOREIGN PATENT DOCUMENTS

WO    WO2016113663 A1    7/2016

OTHER PUBLICATIONS

Hossain Shahriar, Client-Side Detection of Cross-Site Request Forgery Attacks, 2010, 21st International Symposium on Software Reliability Engineering (Year: 2010).*

(Continued)

*Primary Examiner* — Mahfuzur Rahman
*Assistant Examiner* — Richard W Cruz-Franqui
(74) *Attorney, Agent, or Firm* — Buckley, Maschoff & Talwalkar LLC

(57) ABSTRACT

A client comprising a web browser is provided. The client is configured to: run an application in the web browser, the application comprising a sensor including sensor JavaScript code, wherein running the application comprises executing the sensor JavaScript code as the first JavaScript code in the web browser to activate the sensor; and wherein the sensor is configured to: gather data with respect to the application at runtime; and check predetermined application-specific rules against the gathered data for detecting client-side attacks at runtime.

18 Claims, 6 Drawing Sheets

(56) References Cited

U.S. PATENT DOCUMENTS

| | | | | |
|---|---|---|---|---|
| 2013/0067556 | A1* | 3/2013 | Minear | H04L 63/02 726/11 |
| 2014/0165204 | A1* | 6/2014 | Williams | H04L 63/02 726/25 |
| 2014/0215605 | A1* | 7/2014 | Decime | H04L 63/1441 726/22 |
| 2015/0256556 | A1* | 9/2015 | Kaminsky | H04L 63/168 726/23 |
| 2016/0036838 | A1* | 2/2016 | Jain | H04L 63/1416 726/23 |
| 2016/0080345 | A1* | 3/2016 | Safruti | H04L 67/02 726/6 |
| 2016/0088015 | A1* | 3/2016 | Sivan | H04L 29/08 726/23 |
| 2018/0198807 | A1* | 7/2018 | Johns | H04L 63/1416 |

OTHER PUBLICATIONS

NPL Search (InnovationQ) (Year: 2020).*

Sebastian Lekies et al.; 25 Million Flows Later—Large-scale Detection of DOM-based XSS; proceedings of CCS'13, Nov. 4-8, 2013, Berlin, Germany; 12 pages (https://ben-stock.de/wp-content/uploads/domxss.pdf).

Gustav Rydstedt et al.; Busting Frame Busting: a Study of Clickjacking Vulnerabilities on Popular Sites; published online Jul. 20, 2010; 9 pages; (https://seclab.stanford.edu/websec/framebusting/framebust.pdf).

Lin-Shung Huang et al.; Clickjacking: Attacks and Defenses; proceedings of 21 USENIX security symposium, 2012; 16 pages; (https://www.usenix.org/conference/usenixsecurity12/technical-sessions/presentation/huang).

Martin Johns et al.; Tamper-Resistant LikeJacking Protection; Proceedings of the 16th International Symposium on Research in Attacks, Intrusions, and Defenses—vol. 8145; pp. 265-285 (https://dl.acm.org/citation.cfm?id=2941590.2941609).

Steve Hanna et al.; The Emperor's New APIs:On the (In)Secure Usage of New Client-side Primitives; published online Jan. 2010, 9 pages (https://www.researchgate.net/publication/242688647_The_Emperor%27s_New_APIs_On_the_InSecure_Usage_of New_Client-side_Primitives).

Sooel Son et al.; The Postman Always Rings Twice: Attacking and Defending post Message in HTML5 Websites; published by the University of Texas at Austin; 14 pages; (http://www.cs.utexas.edu/~shmat/shmat_ndss13postman.pdf).

Daniel Bates et al.; Regular Expressions Considered Harmful in Client-Side XSS Filters; Proceedings of the 19th International Conference on World Wide Web, WWW 2010, Raleigh, North Carolina, USA 9; pages (https://www.researchgate.net/publication/221023993_Regular_expressions_considered_harmful_in_client-side_XSS_filters).

Mario Heiderich et al.; IceShield: Detection and Mitigation of Malicious Websites with a Frozen DOM; Proceedings of the 14th international conference on Recent Advances in Intrusion Detection, 2011: 20 pages (https://dl.acm.org/citation.cfm?id=2186348).

Ben Stock et al.; Precise Client-side Protection against DOM-based Cross-Site Scripting; Proceedings of the 23rd USENIX Security Symposium. Aug. 20-22, 2014; San Diego, CA; 17 pages (https://www.usenix.org/node/184492).

Phu H. Phung et al.; Lightweight Self-Protecting JavaScript; proceedings of ASIACCS'09, Mar. 10-12, 2009, Sydney, 14 pages (http://www.cse.chalmers.se/~dave/papers/ASIACCS09.pdf).

Adam Barth et al.; Securing Frame Communication in Browsers; published online Jan. 2009; 14 pages (https://www.researchgate.net/publication/220425553_Securing_frame_communication_in_browsers).

Amit Klein; DOM based cross site scripting or XSS of the third kind. A look at an overlooked flavor of XSS; published online Jul. 4, 2005; 8 pages; (http://www.webappsec.org/projects/articles/071105.shtml).

Tongbo Luo et al.; Attacks on WebView in the Android System; Proceedings of the 27th Annual Computer Security Applications Conference 2011; Orlando, Florida, USA; 11 pages (https://dl.acm.org/citation.cfm?id=2076781).

Jill Scharr; Facebook Scam Tricks Users Into Hacking Themselves; published online Jul. 28, 2014; 4 pages; (https://www.tomsguide.com/us/facebook-self-xss,news-19224.html).

Jonas Nygaard Blom et al.; Click bait: Forward-reference as lure in online news headlines; appears in Journal of Pragmatics vol. 76, Jan. 2015; 14 pages; (https://www.sciencedirect.com/science/article/pii/S0378216614002410).

Singh et al.; "Issue 333752—chromium—Google Chrome WebRTC IP Address Leakage—Monorail", Jan. 2014; 15 pages; (https://bugs.chromium.org/p/chromium/issues/detail?id=333752).

Gollucci, "apache.org incident report for Apr. 9, 2010" Blog, Apr. 2010; 9 pages; (https://blogs.apache.org/infra/entry/apache_org_04_09_2010).

Phu H Phung et al; "Lightweight self-protecting JavaScript", appears in ASIACCS '09 Proceedings of the 4th International Symposium on Information, Computer, and Communications Security; Sydney, Australia—Mar. 10-12, 2009; pp. 47-60.

European Search Report for EP application No. 17000048.3, dated Jul. 5, 2017; 9 pages.

* cited by examiner

CLIENT-SIDE ATTACK DETECTION IN WEB APPLICATIONS

RELATED APPLICATION

The present patent application claims the priority benefit of the filing date of European Patent Application No. 17000048.3, filed 11 Jan. 2017, titled "CLIENT-SIDE ATTACK DETECTION IN WEB APPLICATIONS WITH JAVASCRIPT", the contents of which is incorporated herein by reference in its entirety.

FIELD

The following description relates to a client, a network, a method and a product for detecting client-side attacks in a web application.

BACKGROUND

The World Wide Web (or the Web) has grown to a serious competitor for native applications in terms of development's main target platform. The browser is among the most widely installed platform-independent execution spaces. More and more applications, which previously had to be implemented for different platforms (e.g. Windows®, Mac®, Linux®) and installed on client devices, can now be easily consumed with a browser over the Internet.

Google® was at the forefront of this era, offering an email service (Google® Mail) and an office suite (Google® Drive and Google® Docs) accessible on the Web. Soon others followed, for example Apple® brought up its iWork® suite to the Web via the iCloud website and Microsoft® offers its office suite via the Internet as Office 365®. Further, SAP® AG launched SAP® S/4 Hana based on its own web framework SAPUI5®, so that also key company processes in e.g. accounting, human resources and production can now be executed in a browser. The availability of a wide array of services on the Web has numerous advantages for the users, such as accessibility, automatic backups, and the possibility of simultaneous collaborative work on documents instead of sending files back and forth.

This trend towards the Web goes hand in hand with increasingly powerful features that browsers offer to developers of web applications (web developers for short), which enable them to create more and more sophisticated applications. One example is the service workers application programming interface (API), which offers web developers a client-side programmable proxy, giving them the choice of how to handle Hypertext Transfer Protocol (HTTP) requests. Furthermore, the World Wide Web Consortium (W3C) is about to standardize other advanced features like an API for background sync enabling actions to be deferred until the user has stable connectivity, API for notifications allowing alerting users of occurrences, e.g., outside a context of a web page, etc.

As a result, increasingly more code is being executed on the client side in the browser. The downside of this shift of application logic from the server to the client is that a new class of vulnerabilities present solely on the client side is being maliciously exploited. Lekies et al. showed in "25 million flows later: large-scale detection of DOM-based XSS", ACM Press, 2013, pp. 1193-1204, that among the 5000 websites that generate the majority of Web traffic, as identified by Alexa Internet Inc. (Alexa Top 5000), a staggering 9.6% carried at least one Document Object Model (DOM)-based cross-site scripting (XSS) vulnerability. This is only one type of possible client-side vulnerabilities, which can, for example, lead to session-stealing, giving the attacker the possibility of impersonating the victim, stealing credit card information from online shops, and so on.

The existing attack-prevention techniques heavily focus on the server side, in order to prevent e.g. Structured Query Language (SQL) injection, Remote Code Execution (RCE), and others.

SUMMARY

According to one aspect, a client comprising a web browser is provided. The client is configured to:
run an application in the web browser, the application comprising a sensor including sensor script code, wherein running the application comprises executing the sensor script code as the first script code in the web browser to activate the sensor; and wherein the sensor is configured to:
gather data with respect to the application at runtime;
check predetermined application-specific rules against the gathered data for detecting client-side attacks at runtime.

A client is a piece of computer hardware or software that may access a service made available by another piece of computer hardware or software called server. A client may be or comprise a web browser, which is a software application for retrieving information resources from the Web in the form of web pages including text, images, videos etc. The information resources retrieved by a browser may constitute an application program, or "application" for short, which is a set of ordered operations for a computer to perform and designed to fulfil a specific function directly for the user or for another application program. An application that can be executed directly via the web browser and needs not be installed locally on a device is also called a web application. The terms "web page" and "web document" may be used as synonyms for "(web) application" in the following.

The client is configured to run a web application in the web browser, wherein the application has, integrated in it, a sensor for detecting client-side attacks. The sensor may be used by the application provider to protect their applications. The application provider may configure and incorporate the sensor in the application when developing it. Consequently, when the application is provided to the user through the web browser, the user is automatically protected from malicious actions in virtue of the integrated sensor. Advantageously, no input or action is requested from the user, since the sensor is activated by merely running the application. Thus, the security of the application is not left to the user, who might forget to activate the sensor or dismiss an invitation to activate it e.g. because he erroneously believes that he does not need the sensor and that it constitutes a nuisance to his operations.

Furthermore, the fact that the sensor is designed to be configured and integrated in the application by the web developer himself allows the sensor to be tailored to the specifics of the given application scenario. The sensor is adapted to the respective web application. In other words, the sensor can target general, application-independent attacks as well as specific, application-dependent attacks and is more effective in detecting attacks because it "knows" precisely the environment that it has to protect. The sensor can check suspicious activity related to the running application and, being application-specific, can more accurately pinpoint what qualifies as suspicious activity in that specific context. Indeed, attacks on the client side may take many different forms and an application-independent measure is bound to be prone to false positives and false negatives, since discerning what falls under the normal running of the application and what is an attack for a broad range of web applications (email, office suites, etc.) can only be done on a coarse level. Conversely, an application-specific sensor can make use of precise attack detection patterns defined according to the application itself.

Additionally, since the sensor is active in parallel to the running application, it can detect attacks at runtime. In other words, the sensor is constantly active as long as the application is running and "sees" everything that happens within the browser on which the application is running, so that it cannot be circumvented. Further, the sensor can react in runtime against the attack, e.g. by alerting the user. This makes the sensor more effective at countering attacks and preventing the user from coming to any harm.

The runtime response of the sensor could be chosen from a hierarchy of measures that may be taken according to the seriousness of the attack. In a basic step after detecting an attack, the concrete action taken by the user may be denied, since there is an attack going on. A further step may be to forcefully stop the complete session of the user, so that he has to reload the whole website and needs to re-login. A yet further step may be to disable the user account and let him re-confirm via a different means (e.g. email) that he is in fact the real owner of the account. A final step may be to block the user account until e.g. the support department has talked to him on the phone and instructed him on what just happened and how he needs to protect himself (e.g. do not click on suspicious-looking links in emails, etc.). Only one or more of the above actions may be performed by the sensor in response to a detected client-side attack.

In order for the sensor to be easily integrated into the application, the sensor may comprise code written in JavaScript®. This code may also be referred to as "script" or "program" in the following. For example, the sensor may be implemented as a JavaScript library, which contains pieces of pre-written code that can be referenced from the web application without physically including the code in the HyperText Markup Language (HTML) document. HTML is the standard language for web pages and can embed programs written e.g. in JavaScript. When an application is loaded, the HTML source is parsed and its elements are turned into the Document Object Model (DOM) by the web browser. While parsing, if a tag for a script is encountered, the script is executed before parsing can resume. JavaScript code renders the HTML dynamic, in that it can e.g. modify the HTML elements or react to events in the web page. Since web browsers have the ability to interpret scripts embedded within HTML content by default, the sensor can be used with all existing browsers, as exemplarily it only requires the usage of a JavaScript library in the website hosting the application. The JavaScript code contained in the sensor is, thus, simply injected into the application at runtime. A smooth and easy integration of the sensor in the application for the web developer is thereby made possible. The sensor is "transparent" in that it can be adapted to and integrated into various applications. As also discussed above, no installation process, i.e. no user interaction, is needed to activate the sensor.

The scripts in the HTML source are executed serially unless provided with defer or async tags. The JavaScript code included in the sensor must be executed at first, i.e. before all other scripts in the HTML source of the application. In this way the sensor JavaScript code can monitor all subsequent scripts and detect whether any of these scripts is malicious. It is, thus, important that the parser of the web browser, when loading and running the application, encounters the sensor JavaScript code as the first code to be executed prior to any other code. In order to preserve this priority of the sensor JavaScript code, the transfer of the web application (including the sensor) over the network may be secured, e.g. via Hyper Text Transfer Protocol Secure (HTTPS). Without any security measure, the sensor may be prevented from running in the browser by being removed. For example, the reference to the sensor may be removed from the HTML file or the JavaScript file in which the sensor library is stored may be swapped with an empty file.

As soon as the code is active within the monitored web document, all targeted attacks can be observed. The sensor gathers data with respect to the application at runtime. It is important to notice that, since the sensor is part of the application itself and runs with it in the web browser, the sensor "sees" exactly what the browser "sees". In particular, the sensor observes the processes taking place in relation to the application at runtime, after the code was parsed by the browser. Therefore, the sensor has an advantage over all static code-analysis methods, for example code obfuscation methods will not affect the performance of the sensor.

The sensor observes the application running in the browser and collects data about it. These data are employed for detecting client-side attacks by checking rules that are at least partially defined specifically for the application against the data. Specifically, the sensor may detect client-side attacks based on web technologies. In particular, the sensor may be configured to detect attacks that make use of functionalities of HTML and Cascading Style Sheet (CSS), which is another language used in combination with HTML, and of web Application Programming Interfaces (APIs). Additionally, manual manipulation of the application by the user himself via the developer tools console may be detected. Conversely, implementation bugs in browsers and technologies such as Flash that can be included on websites may be excluded from the scope of protection of the sensor. According to one example, the sensor may be configured to detect any of a clickjacking attack, a PostMessage spoofing attack, a DOM-based XSS attack, a WebView attack and a self-XSS attack (see also "Detailed Description" for further details on these attacks).

As described above, the sensor is application-specific. Accordingly, the rules on the basis of which the data are evaluated may be at least in part application-dependent. For example, in order to detect attacks that lead to the same pattern across different applications, general application-independent rules may be used. Conversely, when an attack manifests itself in different forms depending on the application against which it is performed, application-specific rules may be implemented. The application-specific rules may be determined by the web developer, when integrating the sensor in the application, on the basis of the distinctive features of the application and/or of its environment. The sensor may, thus, check both general and application-specific rules.

The rules may be e.g. in the form of constraints on the content of the data, meaning that an attack may be detected according to whether the data respect the constraints or not. A constraint may be positive, i.e. indicating that something falling within the constraint is allowed, so that, when the data meet the requirements imposed by the constraint(s), no attack is detected. Alternatively, a constraint may be negative, i.e. indicating that something falling within the constraint is prohibited, so that, when the data meet the requirements imposed by the constraint(s), an attack is detected. A sensor may implement a combination of positive and negative constraints.

According to one example, gathering data with respect to the application may comprise gathering data about the behavior of the application and/or the behavior of a user of the application. In particular, collecting data about the behavior of the application may include examining the actions of scripts running in the web browser in the context of the application. It is worth stressing that data may be gathered about the behavior of these scripts and not merely about their presence or appearance, such as syntactical characteristics (e.g. suspicious unicode chars or dangerous tags). Again, the sensor gathers the data at runtime and, thus, sees the actual effects of the scripts on the application. For example, the sensor may collect data about the presence of frames and their visibility, in order to prevent a clickjacking attack. In addition or alternatively, the sensor may employ detection methods that rely on the behavior of a user that is interacting with the application, e.g. on actions performed by the user within the browser, such as a mouse movement or a keystroke.

Further to this example, the predetermined application-specific rules may define an expected behavior of the application and/or an expected behavior of the user of the application and the sensor may be configured to detect a client-side attack:

when the gathered data indicate a behavior of the application and/or a behavior of the user of the application different from the expected behavior of the application and/or the expected behavior of the user of the application, respectively; or when the gathered data indicate a behavior of the application and/or a behavior of the user of the application matching the expected behavior of the application and/or the expected behavior of the user of the application, respectively.

In other words, the rules may define an expected behavior of the user and/or of the application in the circumstances of an attack. In this case, the attack is detected when the behavior of the application and/or of the user, as revealed by the gathered data, corresponds to the behavior expected in an attack. Conversely, the rules may define expected behaviors in safe circumstances. In this case, the attack is detected when the behavior of the application and/or of the user, as revealed by the gathered data, does not correspond to what is expected in safe circumstances. Obviously, the expected behavior of the user is compared with the behavior of the user as indicated by the gathered data and the expected behavior of the application is compared with the behavior of the application as indicated by the gathered data.

The expected behavior may be partially defined by the rules, in the sense that the rules may not cover all possible aspects of the application's and/or user's behavior. For example, the rules may define the expected user behavior with respect to mouse movements and clicks but not with regard to keystrokes.

According to another example, the sensor may be further configured to detect events related to the application at runtime and gathering data may comprise gathering data only when an event is detected.

The gathering of data may occur continuously while the application is running. Alternatively, the gathering may be triggered by certain events detected by the sensor. An event may occur when the user or the browser manipulates the web page. Examples of events may include, but are not limited to: the loading of the page, the movement of the mouse pointer, the dropping of a dragged element, the resizing of a window, the change of an element in the page. In response to the detection of any of these events, the sensor may collect data about the current state of the application. The gathering function of the sensor may then remain idle until the next event is detected. Exemplarily, the gathering of data may also be application-specific, in that the events that trigger collecting the data may be chosen e.g. by the web developer according to the particular application.

According to a yet further example, the sensor may comprise a plurality of sub-sensors and each sub-sensor may be configured to gather a different subset of data and check a different subset of predetermined application-specific rules.

In other words, the sensor may be split in multiple sub-sensors, which may control different aspects of the application. The sensor may then comprise a plurality of JavaScript libraries that can be singularly referenced in the HTML document. Different sub-sensors may be activated according to the attacks that are to be detected. For example, one sub-sensor observing whether the web page is framed may be used for preventing clickjacking attacks, whereas a sub-sensor observing the application's use of DOM-related APIs may be used for preventing DOM-based XSS attacks. A further example includes a sub-sensor gathering only data related to the user behavior and a sub-sensor gathering only data related to the application behavior.

According to another aspect of the invention, a client comprising a web browser is provided. The client is configured to:

run an application in the web browser, the application comprising a sensor including sensor JavaScript code, wherein running the application comprises executing the sensor JavaScript code as the first JavaScript code in the web browser to activate the sensor; and wherein the sensor is configured to:

gather data with respect to the application at runtime;

send the gathered data to at least one server at runtime.

According to a related aspect of the invention, a computer network comprising at least one server and at least one client according to the previous aspect is provided. The at least one server is configured to analyze the gathered data for detecting client-side attacks at runtime.

In an aspect of the invention, detection is achieved by identifying attack patterns via at least partially application-specific rules. Another way to detect client-side attacks is to look for anomalies in the data at the server side (e.g. through the means of SAP® Enterprise Threat Detection). These two approaches can be combined. In other words, a sensor may do both, directly enforce the rules and send the data to a server to let the server detect the attacks. Exemplarily, the sensor may detect some kinds of attack by itself and may let the server detect other kinds of attack.

It is important to note that both, checking the rules by the sensor and analyzing the data by the server, rely on the data gathered by the sensor that is integrated in the application and is running in the browser. Therefore, while server-side detection techniques rely on data that is observable on the application's server side, the sensor is capable of detecting client-side attacks, which are only visible within the web browser itself.

The client may send the gathered data to the server through the network. The client may send all gathered data without any filter or it may select which data are to be sent to the server. The selection of the data to be sent may be application-specific. In any case, the data are sent at runtime. There is, thus, a real-time interplay including real-time data exchange and/or evaluation between the sensor at the client side and the server, the combined actions of which enable the detection of attacks. One advantage over the so-called "web analytics" tools, which focus on tracking users and on exceptions- and error-reporting for developer feedback, is that these solutions can only report on client-side attacks, if at all, but not detect such attacks in real-time.

The server may analyze the data for anomalies and identify an attack being carried out against the application running in the browser. Anomalies that may be detected arise from variations in the way the client interacts with the application server or other hosts (manifested as http requests), as well as in machine local communications (usage of storage) or browser internal communications (usage of message API). These anomalies can be outliers with respect to the usual distribution of metric quantities or sequential outliers with respect to the usual order of events. A further class of anomalies can be found by multi-user monitoring of the frequency and context of the occurrence of used browser features. Finally, there are anomalies that reflect changes in the usage of the browser itself and which can be found by monitoring the consistency of quantities related to think times, mouse movements, click characteristics across different sessions.

Thus, the analysis carried out by the server may also be application-specific, i.e. the analysis may rely on distinctive features of the application.

The analysis of data at the server side may also imply the definition of an expected behavior of the application and/or of the user as discussed above. The server may apply certain criteria to evaluate the received data and decide which data constitute an indication of an attack. The ensemble of data that do not raise a flag may be considered as defining an expected behavior in safe circumstances. Conversely, the ensemble of data that trigger an attack detection may be considered as defining an expected behavior in unsafe circumstances. Again, the definition of these behaviors may be application-specific.

According to one example, the server may be provided with machine-learning algorithms for defining and/or detecting a client-side attack. Examples of algorithms are artificial neural networks, Bayesian networks, density-based clustering and random forests.

According to another example, the client, before running the application, may be further configured to request the application from the server and receive the application from the server. In other words, the server may provide the application including the sensor to the client and then detect attacks against such application. Alternatively, the computer network may comprise at least two servers, one that provides the application and one that detects the attacks.

According to a further example, the server may be configured to store gathered data obtained from running the application a plurality of times. In particular, the application may run on the same client multiple times and the sensor may send each time the gathered data to the server, which may store and collect all the data. Alternatively, the computer network may comprise a plurality of clients that send data to the server and the server may store the gathered data obtained from running the application on the plurality of clients. It is important to notice that, since the sensor is integrated within the application, it always protects the same application. Therefore, the data collected by the sensor are focused on that application and can be used to improve the efficiency of detection. For example, the stored data may be used at least partially in the analysis of the data to define the expected behavior of the application and/or of the user.

Further, the stored data may be used to train the machine-learning algorithm at the server side. In contrast, a protective measure designed to be used by an end user on his browser monitors a variety of applications and cannot provide a coherent and meaningful set of data to a server. In other words, the integrated application-specific sensor allows for server-side data aggregation.

According to a further aspect of the invention, a computer-implemented method is provided. The method comprises:

running, by a client, an application in a web browser, the application comprising a sensor including sensor JavaScript code, wherein running the application comprises executing the sensor JavaScript code as the first JavaScript code in the web browser to activate the sensor;

gathering, by the sensor, data with respect to the application at runtime; and detecting client-side attacks in the web browser by performing, at runtime, at least one of:

checking, by the sensor, predetermined application-specific rules against the gathered data; and sending, by the sensor, the gathered data to a server and analyzing, by the server, the gathered data for anomaly detection.

According to one example, gathering data with respect to the application may comprise gathering data about the behavior of the application and/or the behavior of a user of the application.

Further to this example, an expected behavior of the application and/or an expected behavior of the user of the application may be defined by at least one of the predetermined application-specific rules and the server, and client-side attacks may be detected when:

the gathered data indicate a behavior of the application and/or a behavior of the user of the application different from the expected behavior of the application and/or the expected behavior of the user of the application, respectively; or the gathered data indicate a behavior of the application and/or a behavior of the user of the application matching the expected behavior of the application and/or the expected behavior of the user of the application, respectively.

Still according to this example, the method may further comprise storing, by the server, gathered data obtained from running the application a plurality of times, e.g. more than 10, 100, etc., and wherein the expected behavior of the application and/or the expected behavior of the user of the application is at least partially defined on the basis of the stored gathered data.

According to yet another aspect of the invention, a computer program product is provided. The product comprises computer-readable instructions which, when loaded and executed on a suitable system, perform the steps of a method according to the previous aspect.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

In the following, a detailed description of examples will be given, also with reference to the drawings. It should be understood that various modifications to the examples may be made. Unless explicitly indicated otherwise, elements of one example may be combined and used in other examples to form new examples.

Before describing an exemplary implementation of a sensor for detecting client-side attacks, an overview of the attacks falling under the scope of the sensor is given.

Client-Side Attacks Based on Web Technologies Clickjacking

In the context of a web browser, an iframe (inline frame) is an HTML document embedded inside another HTML document on a website. The iframe displays content independent of its container, so that the content can also originate from a different source and can be loaded independently. The term clickjacking was coined in 2008 by Hansen and Grossman and refers to the use of concealed iframes for luring the user into interacting with a website other than the intended website, i.e. a foreign website. The user thinks he interacts with his chosen content but he is actually interacting with foreign content inside the iframe the attacker has set up. To the foreign website the interaction looks like a legit user session and interaction, so that it is not possible to later trace the attack back to the attacker. This is comparable to Cross-Site Request Forgery (CSRF) attacks, where the trust of the website into the request by the client is abused. Clickjacking is made possible by displaying concealed iframes with the foreign content over the intended website. The concealment of the iframes can be achieved in several ways. For example, the attacker could flash the iframe for just a click event (a few hundreds of a second). Alternatively, the transparency of the iframe can be set to 100%. e.g. with one simple Cascading Style Sheet (CSS) rule filter: opacity (0%). Setting its visibility to "hidden" does not work, as browsers try to protect their users from clickjacking and therefore hidden iframes do not receive user-input events.

Figure 1:
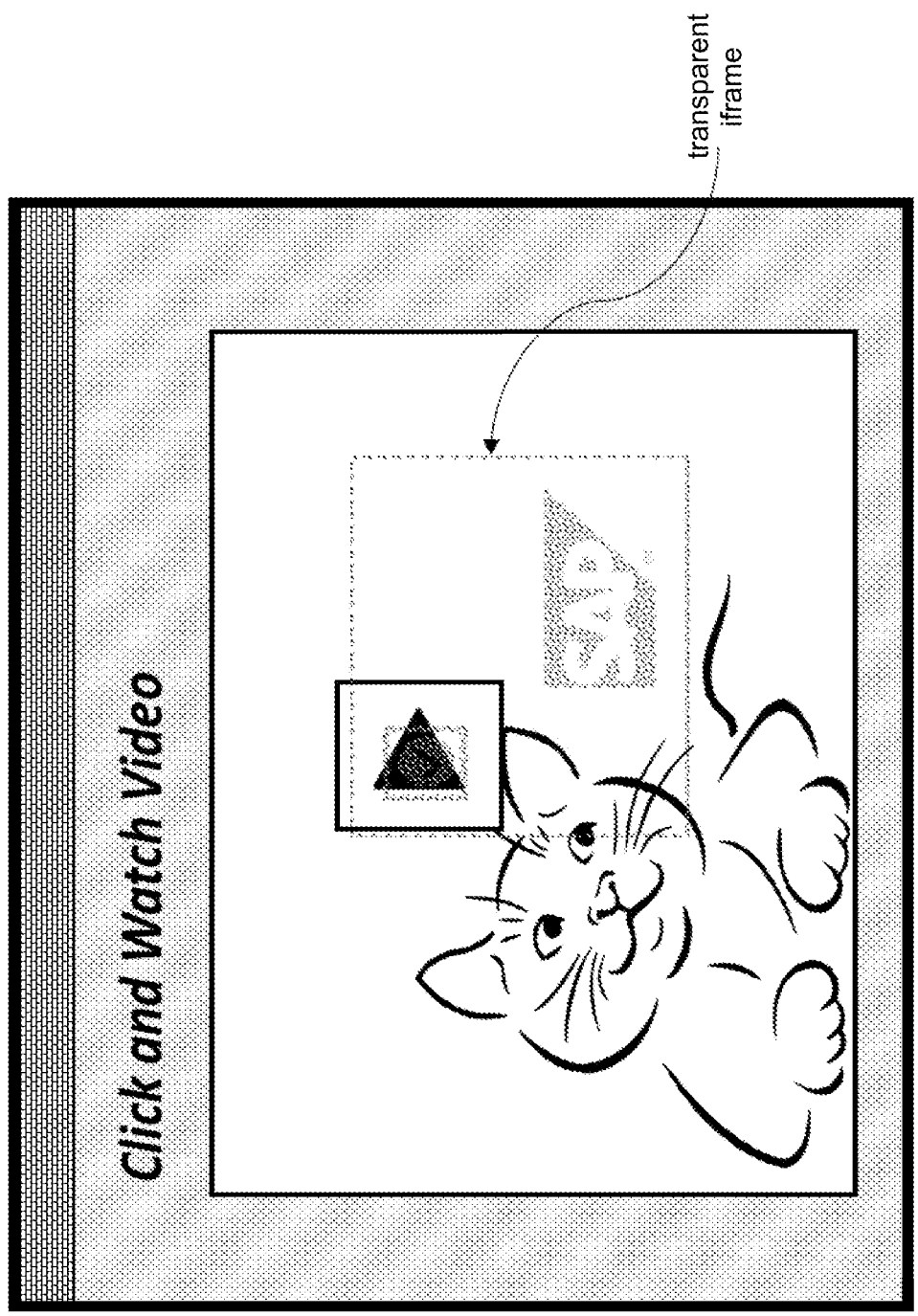
FIG. 1 shows a screenshot of an example of clickjacking.

Based on two minimalistic websites, one for a legitimate website and another one for the attacker, a very minimalistic clickjacking example can be created. A screenshot 100 of such an example is shown in FIG. 1, wherein a value greater than zero was used for the opacity of the iframe so the example setup can actually be seen. The user sees a video play button, something the user would naturally click on. Inside the blue bordered iframe, above that play button, is the submit button of a web application. Other popular choices are Twitter re-tweet, Facebook like- and Flattr support buttons. It is important to notice that the attacker play button is the only thing the user sees.

Several additional sub-categories of clickjacking emerged, based on distinct constraints.

Likejacking is about widgets, which are stand-alone applications that can be embedded into third party sites. The most prominent examples are social-media widgets (e.g. Facebook Like-Button), but additional click-on use cases are finding their way to the Web, like micro-payment service Flattr or the "save for later" service Pinterest. These widgets want to be framed and therefore cannot use the class of declarative prevention techniques, like X-Frame-Options, which can be used to indicate whether or not a browser should be allowed to render a page in a frame, or Content Security Policy (CSP), which enables website owners to declare approved origins of content that browsers should be allowed to load on that website. There is no browser-based security measure to prevent clickjacking in this scenario.

Touchjacking is clickjacking on mobile phones. It turns out that on mobile phones clickjacking is an even more severe problem because of several factors. One is that 53% of the Alexa Top 500 websites use a separate sub-domain (m.*, mobile.*, etc.). On these sub-domains the same basic functionalities are available (Facebook like, Twitter re-tweet, etc.), but the providers refrain from using framing prevention techniques like framebusting. However, touchjacking attacks are stronger than clickjacking attacks. This is done by leveraging unique features available on mobile. For example, browsers on mobile devices make use of the viewport feature. The viewport is the user's visible area of a web page and is expressed in rendering-device-specific coordinates. The user is more likely to hit the invisible button by zooming, due to the smaller screen size and the inaccuracy of touch events on mobile devices. Another example of exploited features is the simple Uniform Source Locator (URL) bar in the user interface (UI) of mobile phones. All major mobile browsers make the URL bar disappear by scrolling down, so that adding a picture of a URL bar to the top of the page can result in a real-looking fake URL bar. A further weakness is the tendency of websites to stretch session lifetime on mobile devices in order not to bother mobile users with login screens as often as on desktop.

Touchjacking can also be achieved by exploiting Web-Views. A WebView is a browser bundled inside of a mobile application. Three different attack scenarios can be identified. In the "WebView redressing attack" one WebView is set up over another to make the upper WebView look like it belongs to the bottom WebView and lure the user to interact with the upper WebView (e.g. tap the Like Button). In the "invisible WebView attack" the traditional clickjacking attack is carried out using WebViews instead of iframes, thereby rendering iframe-based detection techniques (e.g. framebusting or X-Frame-Options) useless. In the "keystrokejacking attack" native UI widgets are placed on top of the HTML elements in the WebView, so that, if the UI widgets are for example input widgets, the application can extract information from the user, who is inadvertently typing in a field belonging to the malicious application.

Postmessage Spoofing

The PostMessage API, or HTML5 Web Messaging, is a message-passing mechanism inside the browser to communicate safely across domain origins. The messages are passed using the internal browser API, so there is no network communication at all. The security of PostMessage is judged on the basis of three criteria: integrity, confidentiality and authenticity. Integrity is guaranteed by the browsers. No attacks on the integrity of PostMessage appear to be known. Authenticity is provided by adding the origin of the sender to every message. With this information, the recipient can assert the origin to be the expected (untampered) sender. Confidentiality is provided by a second parameter in which the sender of a message sets the target origin. The browser guarantees that only the specified origin will receive the message.

When meeting all the criteria, the PostMessage API is secure, however it is not secure by default, in that it burdens the developer with two important tasks. First, a specific target origin must be set. The problem is that the browser allows a wildcard ("*") as target origin, which effectively disables the confidentiality. Developers use it because it is not easy to find out the specific target origin due to the dynamic nature of the Web. Further, both client-side and server-side developers are often not aware of the issue that not setting the specific target origin is breaking the confidentiality. Secondly, the sender origin must be correctly asserted. As applications written in JavaScript grew and nonfunctional requirements (performance, scalability, etc.) needed to be addressed as well, correctly asserting the origin of the message with nothing more than string comparison became an error prone task. A study of the Alex Top 10000 resulted in 84 exploitable domains, due to missing or wrong origin checks (Son and Shmatikov, "The Postman Always Rings Twice: Attacking and Defending postMessage in HTML5 Websites", NDSS, 2013).

Figure 2B:
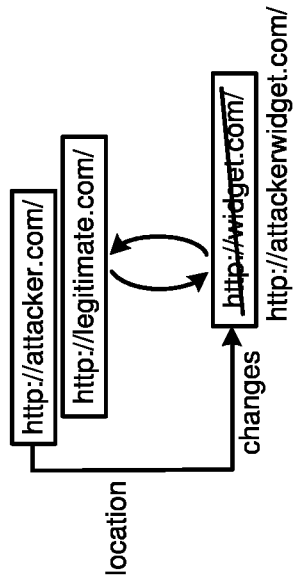
FIGS. 2A and 2B show an example of postMessage spoofing.
Figure 2A:
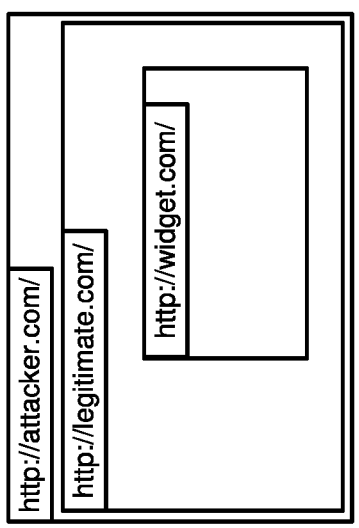

Based on four minimalistic websites (legitimate, attacker, widget and attacker-widget), a PostMessage spoofing example can be created. This is shown in FIG. 2A, which visualizes the pre-attack state of the frames. For this example it is assumed that the developer made the mistake of breaking the confidentiality by using the "*" wildcard and also did not correctly assert the sender origin. Additionally, the attack is made possible by the fact that the attacker can redirect the legitimate website's widget frame. This so called "descendant policy" is deployed by all major browsers today, namely Safari 9.1.2, Firefox 48.0.1, Chrome 53, Edge 20.10240 and IE11. FIG. 2B shows the post-attack state of the frames. It highlights how the attacker can replace the widget with his own implementation to receive messages. Now the attacker has the ability to intercept, eavesdrop and even create completely new messages. In this context, several attack scenarios are possible, e.g. stealing personal information by intercepting messages with a Facebook widget, or, depending on the further processing of the messages, creating a second-order XSS. An advanced attack like a second-order XSS is only possible if the application processing the messages sent via PostMessage happens to store content inside non-volatile client-side storage and replay it on later website visits.

Document Object Model-Based Cross-Site Scripting (DOM-Based XSS)

DOM-based XSS is one type of cross-site scripting, which is a code injection vulnerability wherein attackers inject new malicious code into otherwise legitimate websites. Application specific XSS attack vectors are divided into three groups. The DOM-based XSS is the only attack on the client side, also called Type-0, and it was first described by A. Klein in "DOM Based Cross Site Scripting or XSS of the Third Kind", 4. Web Application Security Consortium, Articles (April 2005), pp. 365-372. In the DOM-based XSS the attack payload is executed as a result of modifying the DOM associated with a webpage in the victim's browser. The HTTP response sent from the server does not contain the attacker's payload, it is the client-side code that executes differently due to the malicious modifications that have occurred in the DOM. The most prominent example is a flow from the URL (e.g. document.location.hash) to a security sensitive function (e.g. document.write).

Figure 3:
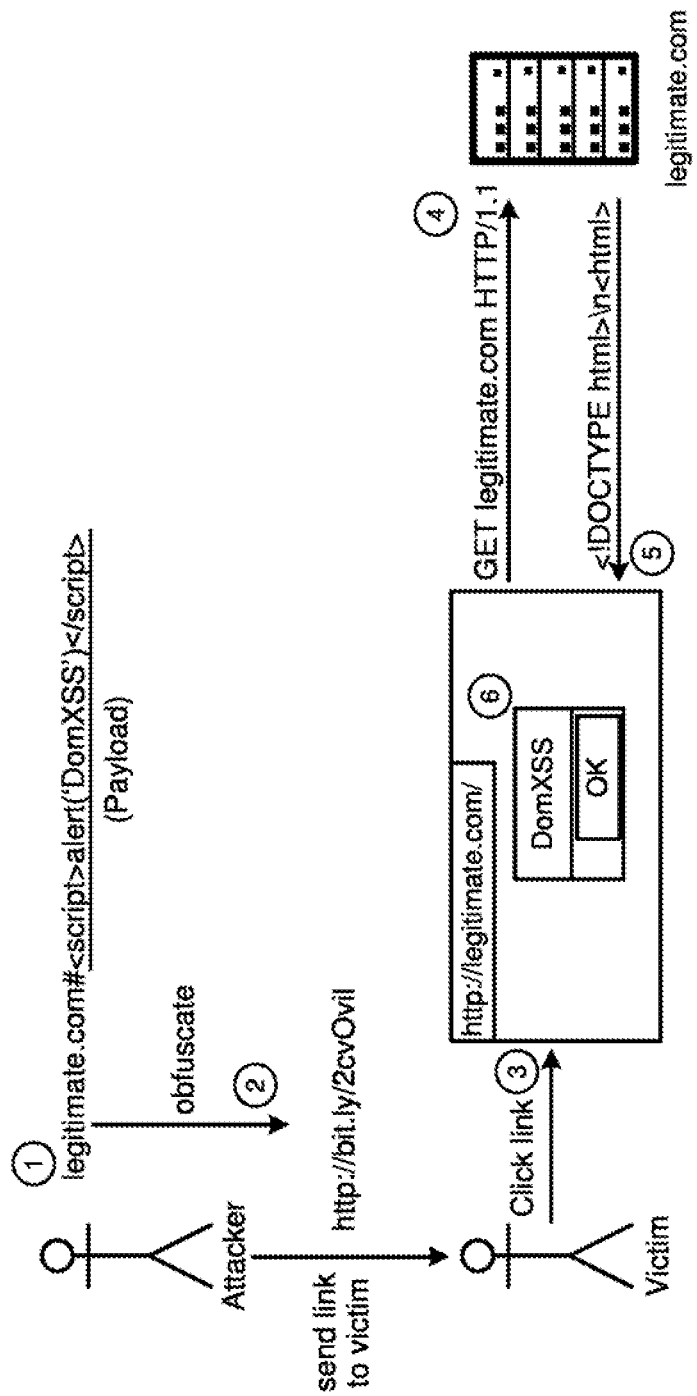
FIG. 3 shows an example of a DOM-based XSS attack.

With one simple website a minimalistic example of DOM-XSS can be built, as shown in the example 300 at FIG. 3. It implements the most common example of DOM-XSS, in which data is read from document.location.hash and then written into the DOM with document.write, without unescaping it first. The attacker can exploit this vulnerability by sending the victim a link in which the payload can be hidden in the URL by obfuscating it with an URL-shortener service like "bit.ly". Once the victim clicks on the link and loads the website, the attacker's payload is executed inside the victim's browser. In the example shown in the figure the attacker's payload opens an alert with the content "DomXSS".

WebViews

The WebView API (called UIWebViews on iOS) is part of smartphone Software Development Kits (SDKs) both of Android and iPhone. WebViews are offered to developers in order to have the best of both worlds: the portability and multiplatform of the web combined with the integration and speed of native applications. With WebViews every native application can implement a custom browser with custom and use-case specific behavior. Additionally WebViews allow integration in both directions. Code inside the WebView can be enabled by the native application to call functions inside the native application and receive the results. This has the potential to augment the information the website already has about the user with information on his smartphone, like his contact and sensor data (e.g. stepcount, orientation, luminosity). On the other hand, the native application can also execute code inside the WebView, with which it is possible to redesign the front-end entirely, highlighting certain use-case specific parts and fading out others. Luo et al. studied the vulnerabilities of these interactions between the WebView and the native application (Tongbo Luo et al., "Attacks on WebView in the Android system", Proceedings of the 27th Annual Computer Security Applications Conference, ACM, 2011, pp. 343-352). Luo et al. identified one single way to introduce new code into a website in a WebView. By executing loadUrl( ) with a JavaScript-URL (URL starting with "javascript:"), all JavaScript code after the colon gets executed.

Figure 4:
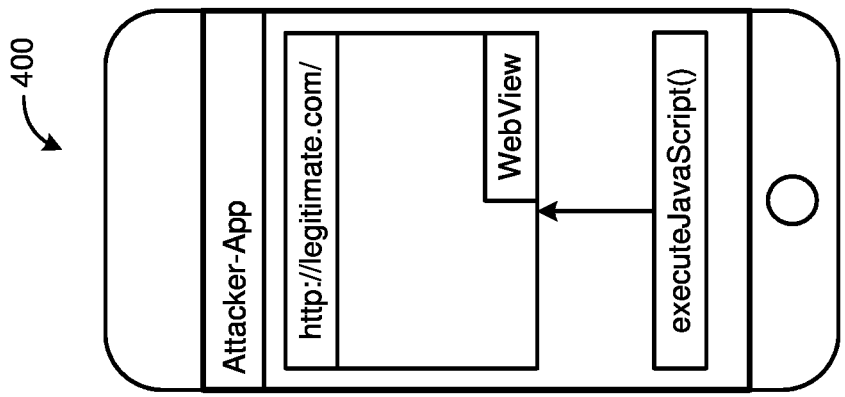
FIG. 4 shows an example of a WebView attack.

As the publication by Luo et al. is already five years old, another look at the WebView API was taken. Since 2011 several new versions of Android were released by Google and a new implementation of the WebView was added, including a new API called evaluateJavascript( ) This API executes JavaScript asynchronously on the currently displayed website. Apple released a major operating system update in 2013 and they also introduced a new API evaluateJavaScript( ) with the same functionality as the Android counterpart. With this additional API there is no string-to-code conversion needed any more, compared to executing code via loadUrl( ) with a javascript-URL which converted the string-based Uniform Resource Locator (URL) into JavaScript code. The new API allows for direct code execution, so the attack via WebView is capability-wise on the same level as Self-XSS (see below). FIG. 4 shows a visualization 400 of an example of a WebView attack.

Self-XSS

Figure 5:
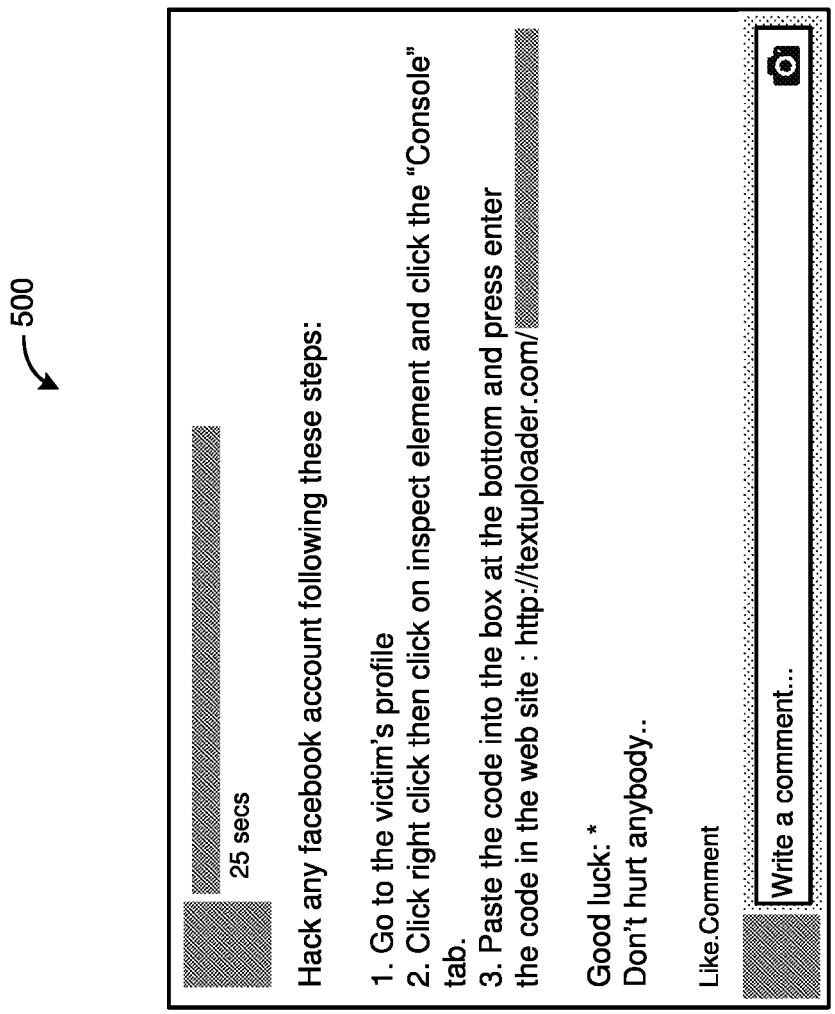
FIG. 5 shows an example of a self-XSS attack.

Self-XSS is a type of XSS caused by the user and it falls into the category of application-independent vulnerabilities, compared to traditional XSS caused by server-side code and DOM-based XSS caused by client-side code, which both fall into the category of application-specific vulnerabilities. It is called Self-XSS because the users attack themselves: attackers lure their victims into pasting their payload into their browser. Two variations of this have been discovered and reported. One is to ask the user to paste the payload via a JavaScript-URL into the browser's navigation bar. This variation can be achieved in two different ways: make the user click a link with the URL, or make him create a bookmark with which he navigates to that URL. The other variation is to ask the user to paste the payload into their Developer Tools console. When the attacker is tricking the user into pasting his payload into the browser, he is in a very powerful position. Without the need of a string-to-code conversion method (e.g. script-tag) the attacker gets to execute code inside the Same-Origin Policy (SOP). The most prominent example is the Facebook Scam of 2014 (Jill Scharr, "Facebook Scam Tricks Users Into Hacking Themselves", July 2014). FIG. 5 shows the Facebook post 500 that the attacker posted. Of course, the code that the victims copied from textuploader.com and pasted into their development tools console was not at all giving them access to other accounts. They were rather exposing their session to the attacker, liking the post and the attacker's Facebook page in order to make the post itself go viral.

Based on the attacker capabilities three different attacker models can be identified. The classification is useful for adequately developing corresponding defensive measures, as explained below. The first model is called "Web attacker". The Web attacker is a legitimate entity of the Web who hosts a website that gets visited by the user. Unfortunately, the user cannot always differentiate between harmless sites and malicious sites that want to harm him. Additionally, it is rather easy for the attacker to lure people onto his website with advertisement or through social-media channels. It is important to note that the Web attacker does not carry out phishing attacks. The visitor of the attacker's website is aware of the website he is on, the attacker is therefore not counting on the visitor to divulge his bank account information on e.g. "bank0fameria.com". But still the attacker has all possibilities that a legitimate website has, including owning a valid SSL certificate for his website, and therefore can use really all APIs that a normal website can use. Even though the Web attacker may sound like a rather mighty attacker, he is actually not when compared to e.g. a network attacker who, for example, would be able to execute a man-in-the-middle attack and harm the user on any website he visits, stealing his information and identity on-the-fly. The Web attacker in contrast has to follow the policies that the web browser enforces to separate websites from each other, most importantly the SOP.

In conclusion a Web attacker uses an authentic web site. The entry barrier is low and therefore forces browser vendors to think about how they can protect their users. This attacker can perform the above-described clickjacking and PostMessage-spoofing attacks. An example attack on users using clickcacking could go down in real-life as follows. The attacker uses click-bait techniques like forward-referencing (Blom and Hansen, "Click bait: Forward-reference as lure in online news headlines", Journal of Pragmatics 76 (January 2015), pp. 87-100) combined with social media to lure users on his website. Again, it should be noted that this is not a phishing attack, because the attacker is not trying to pretend to be a different website in order to trick the user into revealing information. As soon as the user is on the website, the attacker tricks him into clicking onto a specific spot, such as a "read further" button or a click-to-play video, both of which the user would click without hesitation. By placing an invisible e.g. Facebook like-button over those buttons the user is tricked into clicking the invisible button of the attacker. The attacker could, for example, enhance his social-media reach, if he tricked the user into liking his page or profile. Alternatively he could sell Facebook likes to other pages and have his visitors like their pages. Another example is the local IP address leakage via WebRTC (Singh and Wong, "Issue 333752—chromium—Google Chrome WebRTC IP Address Leakage—Monorail", January 2014). This leakage allowed every arbitrary website to query all local IP addresses that the visiting client had assigned. It represents a severe information leakage, as these IP addresses represent internal information potentially from inside a corporate local network.

The second model is called "XSS attacker". The XSS attacker tries to find security vulnerabilities to introduce new code and malicious behavior into the user browser. Unfortunately, every sufficiently complex software has flaws that can be uncovered if someone invests the time to dig deep enough. Additionally, it is rather easy for the attacker to lure people onto flawed sites, as he uses the legitimate real sites. Therefore, even users who check the domains on which they might end up before clicking on the link would not be suspicious. The XSS attacker is able to execute JavaScript within the SOP of a foreign website, i.e. not owned by the attacker. He is forced to find a method which parses and executes his string-based payload, namely a string-to-JavaScript conversion method. Additionally the XSS attacker is allowed to have help in the form of his own servers and websites on the Internet, for example to communicate results back to him.

This attacker is as powerful as he sounds since, with the possibilities of executing JavaScript within the SOP inside the user's browser and session, his payload cannot be differentiated from legitimate source code. The only limitation he has is that he actually needs to find a flow from a source he controls into a string-to-code conversion API to get his payload executed. This means that he still has a certain amount of footprint that could make him detectable. This attacker can perform the above-described DOM-based XSS. In conclusion, an XSS attacker is what the public would call a hacker. He abuses a bug in a website to be able to execute JavaScript code inside the web document. This attacker model therefore forces application developers to think about how they can protect their application. A well-documented example of such an attack and how it can escalate from a website bug to a full-blown database leak is the attack against Apache's server hosting their issue-tracking software from 2010. On Apr. 5, 2010, the attackers posted a new issue to JIRA with a shortened link. They used the URL shortener tinyurl to hide the fact that it was a malicious URL, which pointed back at their JIRA instance and contained an XSS attack. With the payload that got executed, they stole the session cookie from the users logged-in to JIRA, including several JIRA administrators who clicked on the link. On Apr. 6, 2010, the attackers were able to log into JIRA with administrator privileges. They went on to prepare a special silent repository that they needed for exploiting an application bug in JIRA. This allowed them to run JavaServer Pages (JSP) files and they managed to collect all passwords on JIRA logins, which they used to find and login to a local user account with full sudo privileges.

The third model is called "God-like attacker". The God-like attacker is an adversary who is able to bring himself in the position of executing JavaScript without string-to-code conversion. The methods that allow this way of code execution are the above-described self-XSS attack and WebViews attack. While Self-XSS is a form of phishing, making the user follow specific instructions while misinforming him about the outcome of what he is about to do, the WebView scenario is not a form of phishing. It could be argued that it is the same scenario as with the Web attacker: one user cannot always differentiate between a harmless application and a malicious one. One might think that, if the attacker has already an application on the user's smartphone, there is not much more he could get with a WebView attack. It is true that native apps already have a lot of possibilities for harming the user (read contacts, send costly sms, etc.), however native apps are of limited use if the attacker wants to get content from within other apps (like personal information from Facebook, e-mails from Gmail, etc.). Via the WebView the attacker can overcome the separation, he could for example load the legitimate oAuth authorization flow from Facebook, but with his additional code to record the user's password. As this example illustrates, without luring the user into revealing personal information to non-authorized websites, the God-like attacker can attack the user cross-origin. In conclusion, the God-like attacker is clearly the strongest attacker. By being able to execute JavaScript inside every website within the SOP and without leaving any footprint, he is able to steal information and so on at will. The entry barrier is rather high, as it depends on the user following specific instructions (Self-XSS via developer tools console) or falling for a malicious phishing application (WebView). This attacker model forces a wide variety of participants to develop measures in order to prevent attacks, like browser vendors, API designers, specification writers and application developers.

Exemplary Implementation of a Sensor for Detecting Client-Side Attacks

Figure 6:
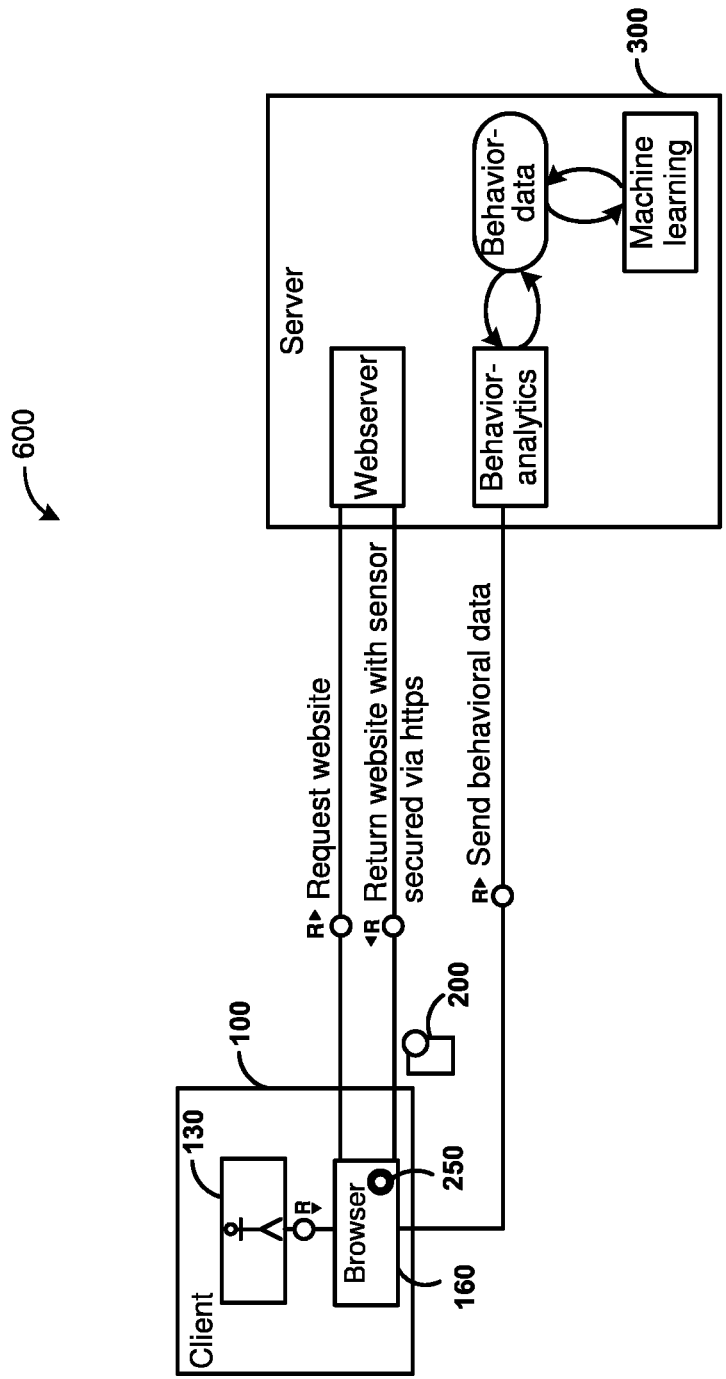
FIG. 6 shows an exemplary implementation of a sensor for detecting client-side attacks.

FIG. 6 shows an exemplary implementation 600 of a sensor for detecting client-side attacks. A client 100 may comprise a web browser 160 being operated by a user 130, who may want to access a web application 200 through the web browser 160. In response to the input of the user 130, such as typing an URL in the browser or selecting a bookmark, the client 100 may send a request for the website hosting the web application 200 to a server 300. The server 300 may comprise a webserver that processes the request via HTTPS, so that the web application 200 is returned to the client 100. The web application 200 may have a sensor 250 incorporated therein in the form of a JavaScript library. The sensor 250 gets delivered to the web browser 160 as part of the response.

The JavaScript library of the sensor 250 may contain code that is executed in the web browser 160 before any other JavaScript code. This requirement may, for example, be important for the sensor to be able to defend itself against the God-like attacker described above. The reason is that the God-like attacker can execute JavaScript code inside the execution space without advance warning, as he does not need string-to-code conversion. In this case, it is important that the whole transfer, or at least the transfer of the website and of the sensor, is secured via HTTPS. Otherwise the needed guarantee that the sensor library is executed first cannot be given.

The sensor library then injects itself into the runtime. Thus, once the web application 200 is loaded in the web browser 160, the sensor 250 may run within the web browser 160 through the web application 200 and observe the web application 200 at runtime. In particular, the sensor 250 may observe the behavior of the application 200 and the behavior of the user 130. Every single state-change and action may be considered an event on which the sensor 250 gathers data to be analyzed to detect attacks against the user 130. Exemplarily, the sensor 250 may comprise distinct sub-sensors running inside the execution space.

The detection may be performed in a rule-based manner directly by the sensor 250. The rules may set a distinction between a desired behavior and an undesired behavior, i.e. a behavior characteristic for an attack. The rules may be application-specific, i.e. determined according to given features of the application. Application-specific rules may more accurately define when a behavior of the application and a behavior of the user indicate suspicious activity.

Alternatively or additionally, the gathered data may be sent back to the server 300. The server 300 may analyze the data and look for anomalies indicating an attack. The server 300 may store and collect the data relating to the behavior of the user and the behavior of the application. Exemplarily, the data may be gathered by multiple instances of the application. The server 300 may employ machine-learning algorithms to detect the attacks.

Attack Detection

With reference to the overview of attacks presented above, the detection of these attacks by the sensor is discussed in the following, also with reference to self-constructed examples to test the efficiency of the sensor.

Clickjacking

As explained, a clickjacking attack lures the victim into interacting with a website and causing a specific action on it different to what the victim perceives to be doing. Therefore, the basic strategy to detect this attack is to check whether the web page got framed and, if so, to check whether the frame is visible. These two occurrences in combination constitute a significant indication that a clickjacking attack is attempted. According to an example, the visibility check may be performed only in response to an event indicating interaction of the user with the application through the mouse. Thus, the data gathered by the sensor may concern the presence of a frame, the visibility of the frame and the mouse interaction of the user with the web page. The rules checked by the sensor may be that the web page must be framed, that the frame must be invisible and that the user is interacting with the website. If the gathered data meet all three conditions, a clickjacking attack is detected. These rules may be implemented in an application-independent manner because, in the case of clickjacking, a rather general definition for a successful attack exists. Whenever the user is tricked into interacting with a website with which he did not intend to interact, the attack is successful.

According to an example, the sensor may comprise three sub-sensors:

"Framed": this sub-sensor observes whether the web page is framed inside an iframe.
"Visible": this sub-sensor detects whether the iframe is visible.
"MouseMove": this sub-sensor observes user interaction with the web page.

The self-constructed example of the attack consists of two very simple websites. The website of the attacker consists of only a button, which typically would lure the visiting user to click on it, e.g. a video play button. The legitimate website also consists only of a button and it would typically be a website on which many users are already logged-in (e.g. social-media, micro-payments, etc.) and that offers one-click actions, e.g. liking a Facebook page, re-tweeting a Twitter tweet or paying a contribution for content. The sensor was successful in detecting the attack.

PostMessage Spoofing

As explained, a PostMessage spoofing attack eavesdrops on the PostMessage communication between two frames. Therefore, the basic strategy to detect this attack is to check whether the website is framed and to observe all child frames for location changes. These two occurrences in combination constitute a significant indication that a PostMessage spoofing attack is attempted. In order to detect PostMessage spoofing, the sensor may gather data about the presence of frames and their location. The rules checked by the sensor may be that the web page must be framed, that child frames must be present and that the location of the child frames is changed. Also in the case of PostMessage spoofing, these rules may be implemented in an application-independent manner.

As discussed above, the PostMessage API can ensure confidentiality if the developer sets the target origin accordingly and it can also guarantee authenticity if the sender origin is checked properly. If both these operations are performed correctly, swapping child iframes with attacker-controlled ones could not lead to eavesdropping. Even though it is not possible to eavesdrop on flawless implementations, it might be nonetheless desirable to detect an attack attempt. It is therefore possible to introduce a second check if the developers actually did set all the parameters on every postMessage( ) call correctly. By observing every call to every iframe on the web page, the sensor could detect usage of the targetOrigin="*" whitelist parameter, indicating a break in the confidentiality and, thus, the presence of an attacker. This information could be fed back to server operated by the website provider, as described with reference to FIG. 6.

According to an example, the sensor may comprise four sub-sensors:
"Framed": this sub-sensor observes whether the web page is framed inside an iframe.
"Frame-Observer": this sub-sensor observes the DOM and detects all iframes being added to it, which may either be declared in the HTML file or added at runtime via JavaScript. It then hands the detect iframes over to other two sub-sensors, "d.location" and "PostMessages".
"d.location": this sub-sensor observes the document.location property of the iframe, which is used to programmatically change the location of an iframe. An attacker could use this to change the location of child iframes.
"PostMessages": this sub-sensor detects all PostMessages received and sent from an iframe. This is meant to be a runtime logging and/or check to provide a second line of defense.

The self-constructed example of the attack consists of four websites:
Attacker site, which is the site that is actually visited by the victim. It frames the legitimate site and redirects its legitimate widget to the attacker-owned widget.
Legitimate site, which includes the legitimate widget and would usually be provided by a social-media site.
Legitimate widget, which provides a PostMessage-based API, acting as a proxy to the provider.
Attacker widget, which copies the appearance of the legitimate widget, incorporates it and replicates its interface in order to eavesdrop on the messages.

The sensor was successful in detecting the attack.

DOM-Based XSS, WebViews and Self-XSS

Differently from the previous cases, there is no clear definition for a successful DOM-based XSS, WebView or Self-XSS attack. Accordingly, the basic strategy to detect any of these attacks is that application developers define application-specific expected behavior for safe circumstances and, as soon as the sensor detects behavior deviating from it, an attack is detected. The burden of defining what is secure and what is not is on the application developer, who is actually the right person to make this decision. Indeed, he defines the behavior of the application by his implementation and, thanks to the sensor, can make sure that that is how it actually behaves after it is delivered to the client.

According to an example, a wide range of sub-sensors may be needed to observe the behavior of the application and/or of the user:
"Cookie", "Session- and Localstorage": these sub-sensors observe the use of client-side storage APIs in the application. They detect all read- and write accesses to either of these three client-side storage types.
"XHR", "Fetch": these sub-sensors observe the application's use of network APIs. They detect outgoing requests from the client, including what URL is requested and what type of request is issued. If ServiceWorkers are available, these sensors can even observe non-programmatic client requests, for example from img tags (see below for more details).
"DOM-Observer": this sub-sensor observes the application's use of DOM-related APIs. Everything that happens in the DOM of the browser, either from parsing the HTML content or added programmatically via JavaScript APIs, is detected.
"Display-Size": this sub-sensor observes the context in which the web application is loaded and executed. The context in which the web application is displayed is an important piece of information and indicator, because it tends to be based on assumptions. Many websites do not know how often they are framed, or visited in other contexts. One example is mobile versions of websites (e.g. m.facebook.com) getting misused for attacks on the desktop.

Further sub-sensors may be needed by the application developer for a specific behavior that he needs to track. An overview of which tools are available to the developer for this purpose is given further below.

The self-constructed example for a DOM-based XSS is implemented as a simple website. The website vulnerability is to write location.hash directly to site via document.write. The attacker can then send a link with a payload to the victim, with the payload reading the cookies and sending them back to the attacker. To translate his code, the attacker injects a script tag, which reads document.cookie and sends it to an attacker-controlled server via XMLHttpRequest. This is similar to the example shown in FIG. 3, but instead of a non-violent alert( ) the attacker tries to actually steal the user session via its cookies. In order to detect this attack, a single rule is put in place. When a new inline script tag, namely a script tag with content instead of a src attribute, is added to the DOM, an attack is detected. This may lead to false positives if a developer leaves an inline script tag in the finished web application. The sensor was successful in detecting the attack.

The self-constructed example for a WebView attack is a website, which for example displays a login form for an oAuth-based login procedure. The user does not know that via the WebView API executeJavaScript( ) the attacker actually added some JavaScript to get the password and not only the oAuth token. The application does not expect any access to the password field input tag via the DOM element. The browser handles the submission of the form via its internal representation, therefore there is no need to access any of the fields' content via JavaScript. Two rules are put into place to detect an attack. Any read-access to the value of the password DOM element attribute and any event-listener attached to the DOM element are a detected attack. The sensor was successful in detecting the attack.

The self-constructed example for a self-XSS attack is based on a simple one-button website. The button triggers an XMLHttpRequest and therefore mimics the behavior of e.g. a like or re-tweet button. The attacker has the victim execute a payload that triggers a multitude of XMLHttpRequest with different parameters. This attack is detected by tying user interaction to network requests. When the sensor observes a XMLHttpRequest without prior user-interaction within a certain threshold, an attack is detected. The sensor was successful in detecting the attack.

It should be noted that existing approaches against self-XSS rely on educating the user and preventing him from executing code via URL-bar and developer tools console. The sensor is capable of detecting abnormal behavior and, thus, gives the web application provider the first tool to deal with Self-XSS directly.

Figure 7B:
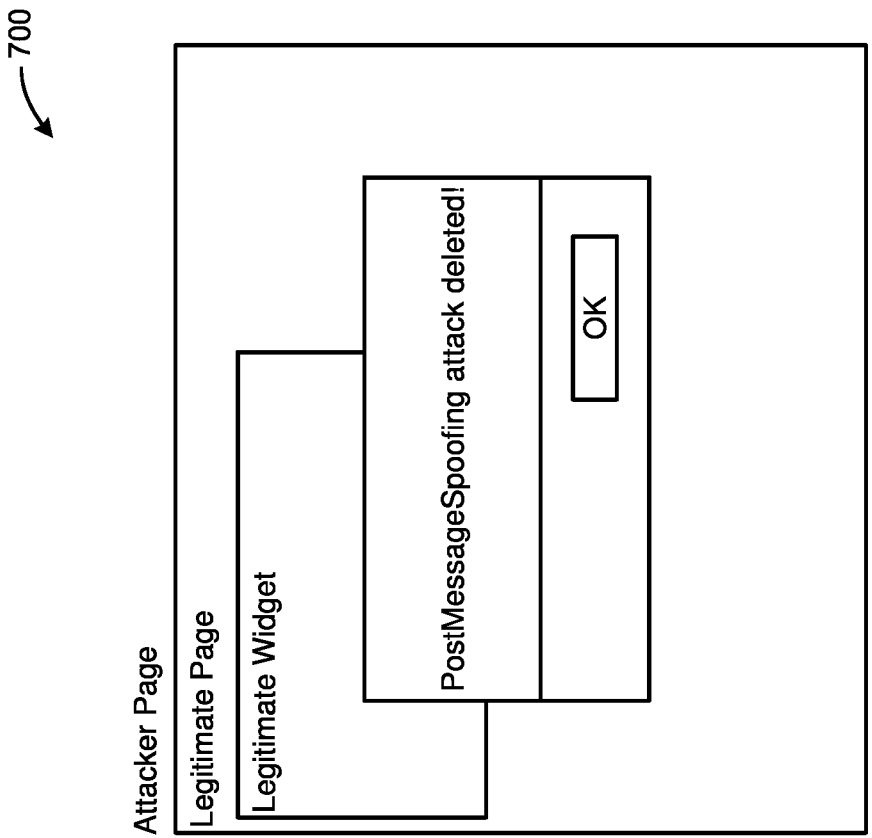
FIGS. 7A-7B show an exemplary implementation of a reaction of the sensor.
Figure 7A:
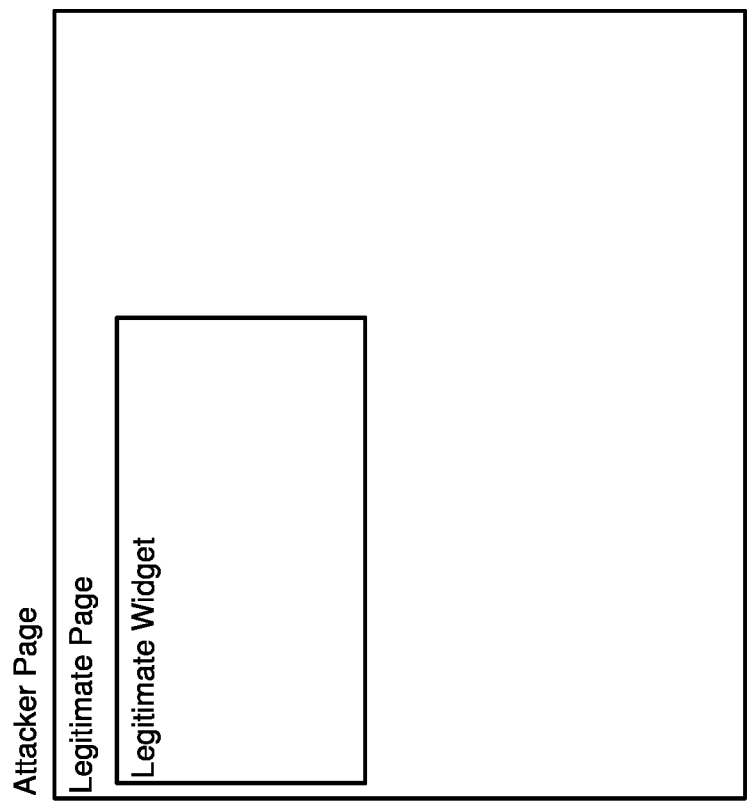

FIG. 7 shows an exemplary implementation of a reaction of the sensor, which displays an alert that an attack has been detected. On the left screenshot (FIG. 7A) the setup of the PostMessage spoofing example is depicted. On the right screenshot (FIG. 7B), the alert box can be seen after the attacker changed the location of the "Legitimate Widget" (the most inner square) to his own "Attacker Widget" and the sensor detected the attack. Alternatively or additionally, the sensor may feed the information back to web developer.

The following table summarizes which sub-sensors may be needed to detect which attack. It is important to note that the last column has all rows checked, which is due to the fact that the application developer is supposed to implement application-specific rules. Therefore, it may not be possible to decide which sub-sensors are needed beforehand and all sub-sensors may need to be considered.

| Sensor/Attack | PM-Spoofing | ClickJacking | Dom-XSS, WebViews, Self-XSS |
|---|---|---|---|
| Framed | ✓ | ✓ | ✓ |
| Visible | | ✓ | ✓ |
| MouseMove | | ✓ | ✓ |
| PostMessages | ✓ | | ✓ |
| Cookie | | | ✓ |
| Storage | | | ✓ |
| XHR | | | ✓ |
| SW-Fetch | | | ✓ |
| DOM-Observer | | | ✓ |
| Frame-Observer | ✓ | | ✓ |
| Display-Size | | | ✓ |
| d.location | ✓ | | ✓ |

The tools available to the developer to integrate additional sub-sensors generally fall in either of the following two categories: either the tool tries to collect information by using a specific API ("Frame-Detection", "Events", "ServiceWorker", "MutationObserver") or it tries to monitor the use of an API ("Getter and Setter", "Proxy", "Function-Wrapping"). The tool "WebWorker" does not fall in either of the two categories. An overview is given in the following.

Frame-Detection

Frame-Detection is based on the conditional statements known from frame busting. To detect the framed state mostly a comparison between the global root object window (also available via its alias self) and top (a pointer to the framing site, also available via its alias parent) are executed. Alternatively it is possible to check whether the array parent.frames exists and has entries.

An example of such a conditional is as presented in Table 1:

TABLE 1

```
1    if( top . location != window . location ) {
2        // Framing detected
3    }
```

In the sensor library frame-detection is used to detect whether the website delivered to the client is framed.

Events

To gather information, event-handlers are a very important API. Almost all actions happening on the client-side can be monitored with Events. Two simple examples of using Event-Handlers are as follows (Table 2 below):

TABLE 2

```
1    // DOM0 , on - attributes
2    document . onclick = function ( event ) {
3        // monitor and /or log the event
4    };
5    // DOM2 , addEventListener
6    document . addEventListener (" click ", function ( event ) {
7        // monitor and /or log the event
8    });
```

The first is the original way of adding Event-Handler to elements, based on on-attributes, called DOM0. The second example shows the newer, improved way of adding Event-Handler, based on addEventListener, called DOM2. With DOM2 multiple Event-Handlers can be registered on a single event, which greatly improves compatibility in terms of including multiple libraries. They also allow finer-grained control of the phase when the listener gets activated and work on any DOM element, not just HTML elements. Events and Event-Handler are used by the sensor library to gather information about what is happening on the client-side.

ServiceWorker

ServiceWorkers are event-driven WebWorkers which offers advanced features for web apps. The main focus for ServiceWorker is the offline capabilities of web apps. Therefore ServiceWorker offer developers a local proxy they can program with custom behavior.

ServiceWorkers are a relative new feature, shipped in Chrome 40 (released Jan. 21, 2015) and Firefox 44 (released Jan. 26, 2016) and are not support by all major browsers yet. A minimal ServiceWorker example is presented at Table 3 below:

TABLE 3

```
1    if(' serviceWorker ' in navigator ) { // Feature detection
2        navigator . serviceWorker
3        . register ('/sw.js ')
4        . then (( registration ) => {
5            console . log (" Registration successful for scope : ", registration . scope );
6        })
7        . catch (( err ) => {
8            console . log (" Registration failed : ", err);
9        });
10   }
11   // sw.js
12   self . addEventListener ('install ', ( event ) => {
13       // pre - fill cache with files needed for offline - experience
14   });
15
16   self . addEventListener ('fetch ', ( event ) => {
17       // answer from cache and /or update content from network
18   });
```

Mind the feature detection in line 1, otherwise the code would crash in line 3 when run in browsers without ServiceWorker implementations.

ServiceWorkers are used by the sensor library to detect non-programmable instantiated network requests. Those requests are initiated by the browser based on the HTML markup of the visited website, for example the URL in the src attribute of an img tag gets downloaded. If ServiceWorker cannot be used, because the browser does not offer the feature yet, these types of requests cannot be observed by the sensor.

MutationObserver

The MutationObserver API allows developers to register an observer on an arbitrary DOM node and receive callbacks with a list of mutations. This API addresses the biggest issue of the now deprecated Mutation events: the performance issues. It optimizes the performance by calling the callback with a list of mutations, instead of a callback for every single event. A simple example for the MutationObserver API is presented at Table 4 below:

TABLE 4

| | |
|---|---|
| 1 | // specify target node |
| 2 | var target = document . getElementById ('unique -id '); |
| 3 | |
| 4 | // instantiate an observer |
| 5 | var observer = new MutationObserver ( function ( mutations ) { |
| 6 | // handle the mutations array |
| 7 | }); |
| 8 | |
| 9 | // start observing the target |
| 10 | observer . observe ( target ); |

In the sensor library the MutationObserver is used to observe the complete DOM of the website. With this implementation technique the sensor library aims at detecting text-to-code conversions inside the DOM, for example adding a script tag.

Getter and Setter

Both "get" and "set" are property attributes, more specifically accessory properties. They both have to be function objects and get called on read- and write-accesses of the specified property. Changing property attributes can be achieved with Object.defineProperty, which either defines a new property with specific attributes, or, if the property already exists, updates the attributes. A simple example of using Object.defineProperty to set getter and setter for an existing property is presented at Table 5 below:

TABLE 5

| | |
|---|---|
| 1 | Object . defineProperty ( object , " propertyName ", { |
| 2 | get : function ( ) { |
| 3 | // handle read - access |
| 4 | }, |
| 5 | set : function ( val ) { |
| 6 | // handle write - access |
| 7 | } |
| 8 | }); |

The sensor library uses the getters and setters to detect and monitor read- and write-accesses on properties, for example document.cookie.

Proxy

The Proxy API is one of the new features of ECMAScript 6, released in 2015. It allows meta-programming in JavaScript, by intercepting all basic interactions with an object, like read- and write-accesses of properties and define custom behavior. This technique has a significant advantage over Getter and Setter as arbitrary accesses can be intercepted and monitored. But on the downside, to override the original property with the new proxied property a write-access is needed. Putting Getter and Setter in place is in contrast only a change of property attributes.

A basic example of a property-access intercepting proxy is presented at Table 6:

TABLE 6

| | |
|---|---|
| 1 | new Proxy ( object , { |
| 2 | get : function ( target , property , receiver ) { |
| 3 | // intercept property get access |
| 4 | }, |
| 5 | set : function ( target , property , value , receiver ) { |
| 6 | // intercept property write access |
| 7 | } |
| 8 | }); |

The proxy implementation technique is used by the sensor library to detect and monitor read- and write-accesses on properties with arbitrary names, for example window.sessionStorage.

Function-Wrapping

Function-Wrapping is based on copying the original function and overriding the API function. The new function then logs the call and calls the copy. It is a very simple but effective technique to monitor function calls. An example implementation of this technique is presented at table 7:

TABLE 7

| | |
|---|---|
| 1 | var copyPostMessage = window.postMessage ; |
| 2 | window . postMessage = function ( message , targetOrigin , transfer ) { |
| 3 | // log function call |
| 4 | copyPostMessage ( message , targetOrigin , transfer ); |
| 5 | }; |

The sensor library leverages this implementation technique to monitor the use of function-based APIs, for example window.postMessage( ).

WebWorker

The WebWorker is an exception, as it is not falling in either of the two categories described at the beginning, i.e. it is not used to collect information or monitor an API. WebWorkers are the threads of the web. They are taking over long-running tasks from the main thread. JavaScript historically is single-threaded, which means that every blocking operation also blocks the responsiveness of the application. This was one of the causes for slow user experiences in the past. To enable the web to be a competitive development target, WebWorkers were specified by the W3C. An example use of WebWorkers is presented at Table 8:

TABLE 8

| | |
|---|---|
| 1 | var worker = new Worker ("pi.js"); // Requests the file pi.js from the server |
| 2 | worker . addEventListener (" message ", function ( event ) { |
| 3 | console . log (" Result : ", event . data ); // " Result : 3.14" |
| 4 | }); |
| 5 | worker . postMessage ({ decimalPlaces : 2}) ; |
| 6 | |
| 7 | // pi.js |
| 8 | this . addEventListener (" message ", function ( event ) { |
| 9 | console . log (" Received Request ", event . data ); |
| 10 | var result = calulcatePi ( event . data . decimalPlaces ); |
| 11 | this . postMessage ( result ); |
| 12 | }); |

The WebWorker is a separate script, which is downloaded and instantiated via the constructor. After that, messages can be exchanged via the PostMessage API. In this example, the WebWorker calculates pi and is parameterized with the amount of decimal places. The result is returned and printed out on the console standard output. WebWorkers in the sensor library are used to apply the rules and therefore detect attacks. Additionally, the worker is responsible for uploading the collected information, which includes authenticating towards the backend, encapsulating the data in the needed format, and sending the network request to the backend.

The sub-sensor may be implemented as a micro-library, meaning it is a stand-alone library without external dependencies. Therefore, a different way of instantiating the WebWorker is needed. An inline declaration of a WebWorker is presented at Table 9:

TABLE 9

```
1   var workerCode = '
2   this . addEventListener ("message ", function ( event ) {
3   var result = calculatePi (event.data.decimalPlaces );
4   this . postMessage (result );
5   });
6
7   var calculatePi = function ( ) {
8   return " 3.14 ";
9   }; ';
10  var blob = new Blob ([workerCode ], { type : " text / javascript "});
11  var url = window . URL . createObjectURL ( blob );
12      ar worker = new Worker (url );
```

By leveraging Blob and URL.createObjectURL( ), the whole WebWorker is encoded in an URL. It is then used to instantiate a WebWorker object. This tool supports the portability of the sensor library, by removing the external dependency.

Table 10 summarizes which tools are used to implement the different sub-sensors. Note that the rows for "Visible" and "Display-Size" are empty, since those sensors can be implemented without the need for a use-case specific implementation technique. They use existing APIs in a standard web-developer way. Additionally the WebWorker is also not listed in the summary as it is an underlying concern for all sub-sensors.

TABLE 10

| Sensor/Impl. Tech. | Events | Service Worker | Mutation Observer | Getter Setter | Proxy | Function-Wrapping | Frame-Detection |
|---|---|---|---|---|---|---|---|
| Framed | | | | | | | ✓ |
| Visible | | | | | | | |
| MouseMove | ✓ | | | | | | |
| PostMessages | ✓ | | | | | ✓ | |
| Cookie | | | | ✓ | | | |
| Storage | | | | | ✓ | ✓ | |
| XHR | ✓ | | | | ✓ | ✓ | |
| SW-Fetch | | ✓ | | | | | |
| DOM-Observer | | | ✓ | | | ✓ | |
| Frame-Observer | | | ✓ | | | ✓ | |
| Display-Size | | | | | | | |
| d.location | | | ✓ | | | | |

In comparison with the counter-measures proposed by Rydstedt et al., Huang et al., and Johns and Lekies against clickjacking (see background section), the sensor according to this application has several advantages. It is easily deployable with a single line of HTML and it is browser-independent, as it does not use browser specific APIs, but only relies on JavaScript. Further, the sensor-library is configured to detect multiple kinds of client-side attacks, rather than being a counter-measure to one specific attack.

In comparison with the counter-measures proposed by Hanna et al. and Son et al. against PostMessage spoofing (see background section), the sensor according to this application is easier to implement as it is out-of-the box compatible with existing applications.

Compared with the counter-measure presented by Lekies et al. against DOM-based XSS (see background section), the sensor according to this application does not rely on a custom browser, it rather relies on JavaScript and is therefore compatible with all major browser today. Further, the sensor according to this application is configured to detect different kinds of client-side attacks, instead of being a counter-measure against one single attack.

In comparison with the tool proposed by Heiderich et al. (see background section), which is designed to be used by an end user as protection against general, site-independent attacks, the sensor is designed to be used by the developers to protect the application they operate. Consequently, IceShield has to rely on imprecise heuristics, which may expose both false positives and false negatives. The sensor according to this application is instead configured and integrated by the site operator, which allows the definition of precise attack detection patterns tailored to the specifics of the given application scenario. Furthermore, IceShield tries to detect code that appears to be suspicious based on syntactical characteristics, e.g. suspicious unicode chars or dangerous tags. Opposed to this, the sensor according to this application monitors the behavior of the JavaScript code running in the document and detects attacks based on the actions and not the appearance of the suspicious code. For instance, detection methods that rely on user behavior, such as mouse movement, are out of scope for IceShield. Further, IceShield requires client-side modifications to the browser of the end user in the form of a browser extension. The sensor according to this application can be used with all existing browsers, as it only requires the usage of a JavaScript library in the website. No actions from the customers are needed. In addition, Iceshield has no concept or capabilities for server-side data aggregation, as the deployment model is on the user side and each monitored site is potentially under the control of a different vendor. In contrast, the sensor according to this application protects the code of the same organization.

Bates et al. and Stock et al. (see background section) share the same approach, in that they are both application-independent (no application-specific rules), client-side techniques to defend against one specific vulnerability class, i.e. Cross-site Scripting. None of the other attacks are in scope. Even other forms of JavaScript inclusion (e.g., self-XSS) are not covered. The protected user has to utilize a modified web browser for the technique to function, whereas the sensor works without client-side modifications. Further, the approach of Bates et al. and Stock et al. does not comprise any cooperation with the server-side application, nor a server-side back-end.

The technique by Phung et al. (see background section) directly addresses the behavior of the attacker's scripts but does not try to detect potential suspicious actions, making it significantly less flexible. Their approach entails a restriction in the execution of JavaScript to combat leakage of sensitive information through control of communication channels. Thus, only a limited, static attacker model is covered by restrictions on selected JavaScript APIs. However, unlike the sensor according to this application, the proposed technique is not able to detect client-side attacks via application-specific rules set via the flexible JavaScript library by the web developer. There is also no backend communication to the protected application server, wherein the server-side data aggregation may allow to detect previously unknown attacks. The approach of Phung et al. involves only the client side. Finally, their technique can detect only a subset of the attacker's activities, namely activities that manifest themselves in direct API calls. In comparison, the sensor according to this application may monitor a wide range of further attack indicators that exceeds simple API monitoring, including postMessages, framing, forged UI interaction, or HTML element inclusion. For example, this is achieved by utilizing significantly more sophisticated ECMAScript 6 features, such as MutationObservers, Object.defineProperty or ES6 Proxies.

What is claimed is:

1. A client system comprising at least one item of computer hardware to implement a web browser, wherein the client system is configured to:
   run an application in the web browser, wherein the application comprising a sensor including executable script code, wherein running the application comprises executing the executable script code as a first executed code in the web browser to activate the sensor; and
   wherein the sensor is configured to:
      gather data with respect to the application at runtime; and
      check predetermined application-specific rules against the gathered data for detecting client-side attacks at runtime, wherein the application-specific rules are configured to specify particular attack detection patterns for specific features of the application, the application-specific rules being defined by a library of the script code, wherein the predetermined application-specific rules define an expected behavior of the application and an expected behavior of the user of the application.

2. The client system according to claim 1, wherein gathering data with respect to the application comprises gathering data about the behavior of the application and the behavior of a user of the application.

3. The client system according to claim 2, wherein the sensor is configured to detect a client-side attack when the gathered data indicate a behavior of the application and a behavior of the user of the application different from the expected behavior of the application and the expected behavior of the user of the application, respectively.

4. The client system according to claim 2, wherein the sensor is configured to detect a client-side attack when the gathered data indicate a behavior of the application and a behavior of the user of the application matching at least one of the expected behavior of the application or the expected behavior of the user of the application.

5. The client system according to claim 1, wherein the sensor is further configured to detect events related to the application at runtime, and wherein gathering of data is performed when an event is detected.

6. The client system according to claim 1, wherein the sensor comprises a plurality of sub-sensors and each sub-sensor is configured to gather a different subset of data and to check a different subset of predetermined application-specific rules.

7. A computer network comprising:
   at least one client system, the client system comprising at least one item of computer hardware to implement a web browser, wherein the client system is configured to:
   run an application in the web browser, the application comprising a sensor including executable script code, wherein running the application comprises executing the executable script code as first executed code in the web browser to activate the sensor; and
   wherein the sensor is configured to:
      gather data with respect to the application at runtime; and
      send the gathered data to at least one server at runtime; and
   at least one server, wherein the at least one server is configured to analyze the gathered data for detecting client-side attacks at runtime based on predetermined application-specific rules, wherein the application-specific rules are configured to specify particular attack detection patterns for specific features of the application, the application-specific rules being defined by a library of the script code, wherein the predetermined application-specific rules define an expected behavior of the application and an expected behavior of the user of the application.

8. The computer network according to claim 7, wherein the at least one client, before running the application, is further configured to:
   request the application from the at least one server; and
   receive the application from the at least one server.

9. The computer network according to claim 7, wherein the at least one server is configured to store gathered data obtained from running the application a plurality of times.

10. The computer network according to claim 7, wherein the at least one server is provided with machine-learning algorithms for defining and detecting a client-side attack.

11. A computer-implemented method comprising:
   running, by a client, an application in a web browser, the application comprising a sensor including sensor script code, wherein running the application comprises executing the sensor script code as first script code in the web browser to activate the sensor;
   gathering, by the sensor, data with respect to the application at runtime; and
   detecting client-side attacks in the web browser by performing, at runtime:
   checking, by the sensor, predetermined application-specific rules against the gathered data, wherein the application-specific rules are configured to specify particular attack detection patterns for specific features of the application, the application-specific rules being defined by a library of the sensor script code, wherein the predetermined application-specific rules define an expected behavior of the application and an expected behavior of the user of the application.

12. The method according to claim 11, further comprising:
sending, by the sensor, the gathered data to a server for analyzing for anomaly detection; and
analyzing, by the server, the gathered data.

13. The method according to claim 11, wherein gathering data with respect to the application comprises gathering data about behavior of the application and behavior of a user of the application.

14. The method according to claim 13, wherein an expected behavior of the application and an expected behavior of the user of the application are defined by at least one of the predetermined application-specific rules and the server.

15. The method according to claim 14, further comprising:
detecting client-side attacks when:
the gathered data indicate a behavior of the application and a behavior of the user of the application different from the expected behavior of the application and the expected behavior of the user of the application, respectively.

16. The method according to claim 14, further comprising:
detecting client-side attacks when:
the gathered data indicate a behavior of the application different from the expected behavior of the application.

17. The method according to claim 14, further comprising:
detecting client-side attacks when:
the gathered data indicate a behavior of the application and a behavior of the user of the application matching at least one of the expected behavior of the application or the expected behavior of the user of the application.

18. The method according to claim 14, further comprising:
storing, by the server, gathered data obtained from running the application a plurality of times, and wherein the expected behavior of the application and the expected behavior of the user of the application are at least partially defined on the basis of the stored gathered data.

* * * * *